US007810975B2

(12) United States Patent
Specht et al.

(10) Patent No.: US 7,810,975 B2
(45) **Date of Patent: *Oct. 12, 2010**

(54) HEADLIGHT ASSEMBLY FOR A MOTOR VEHICLE

(75) Inventors: Stephanie Specht, Stuttgart (DE); Emil Stefanov, Esslingen (DE)

(73) Assignee: odelo GmbH, Schwaikheim (DE)

( * ) Notice: Subject to any disclaimer, the term of this patent is extended or adjusted under 35 U.S.C. 154(b) by 303 days.

This patent is subject to a terminal disclaimer.

(21) Appl. No.: 11/857,817

(22) Filed: Sep. 19, 2007

(65) Prior Publication Data

US 2008/0080207 A1 Apr. 3, 2008

(30) Foreign Application Priority Data

Sep. 19, 2006 (DE) ...................... 10 2006 044 641

(51) Int. Cl.
*G02B 6/10* (2006.01)

(52) U.S. Cl. ...................... 362/555; 362/554; 362/511; 385/121

(58) Field of Classification Search ................. 362/554, 362/555, 511, 521, 545, 331, 311.02, 311.07; 385/88–93, 32, 119, 121
See application file for complete search history.

(56) References Cited

U.S. PATENT DOCUMENTS

| | | | | |
|---|---|---|---|---|
| 4,170,400 | A * | 10/1979 | Bach et al. | 385/119 |
| 6,491,420 | B1 * | 12/2002 | Scifres | 362/553 |
| 6,527,411 | B1 | 3/2003 | Sayers | |
| 7,195,383 | B2 * | 3/2007 | Gebauer | 362/511 |
| 7,286,296 | B2 * | 10/2007 | Chaves et al. | 359/641 |
| 7,401,947 | B2 | 7/2008 | Wanninger et al. | |
| 7,467,885 | B2 * | 12/2008 | Grotsch et al. | 362/555 |
| 7,611,272 | B2 * | 11/2009 | Specht et al. | 362/555 |
| 2006/0087860 | A1 | 4/2006 | Ishida | |
| 2007/0024971 | A1 * | 2/2007 | Cassarly et al. | 359/487 |
| 2007/0206390 | A1 * | 9/2007 | Brukilacchio et al. | 362/555 |

FOREIGN PATENT DOCUMENTS

| | | |
|---|---|---|
| DE | 103 02 969 A1 | 8/2004 |
| GB | 2365962 | 2/2002 |

OTHER PUBLICATIONS

U.S. Appl. No. 11/213,515, filed Apr. 20, 2006.
European Search Report for EP 07017814 dated Dec. 4, 2007.

* cited by examiner

*Primary Examiner*—Stephen F. Husar
*Assistant Examiner*—Peggy A. Neils
(74) *Attorney, Agent, or Firm*—Reising Ethington P.C.

(57) ABSTRACT

The invention concerns a light unit with at least one LED, which includes at least one light-emitting chip as light source, with at least one fiber-optic element optically connected after the light-emitting diode and widening in the light propagation direction, and with a secondary lens optically connected after the fiber-optic element, in which oppositely arranged surfaces bordering the fiber-optic element, which form a bottom surface and a cover surface in a longitudinal section intersecting these surfaces, have oppositely curved curve sections adjacent to the light entry surface, as well as such a fiber-optic element.

A light unit with high light output requiring limited space is developed with the present invention.

12 Claims, 5 Drawing Sheets

HEADLIGHT ASSEMBLY FOR A MOTOR VEHICLE

The invention concerns a light unit with at least one LED, which includes at least one light-emitting chip as light source, with at least one fiber-optic element that widens in the light propagation direction connected optically after the LED and with a secondary lens optically connected after the fiber-optic element, in which two surfaces bordering the fiber-optic element arranged opposite to each other, which form a bottom surface and a cover surface in a longitudinal section intersecting these surfaces, have oppositely curved curve sections adjacent to the light entry surface of the fiber-optic element, in which the bottom surface includes a positively curved curve section, with reference to the light propagation direction, and the cover surface includes a negatively curved curve section, with reference to the light propagation direction, as well as such a fiber-optic element.

This type is light unit is known from DE 10 2005 017 528 A1. This light unit requires a large secondary lens, in order to trap the light emerging strongly divergent from the fiber-optic element. The light unit therefore requires a large space.

The problem underlying the present invention is therefore to develop a light unit with high light output that requires limited space.

This problem is solved with the features of the main claim. In the mentioned longitudinal section, at least one of the curves bordering the fiber-optic element has an inflection point.

Additional details of the invention are apparent from the dependent claims and the following description of schematically depicted variants.

Figure 1:
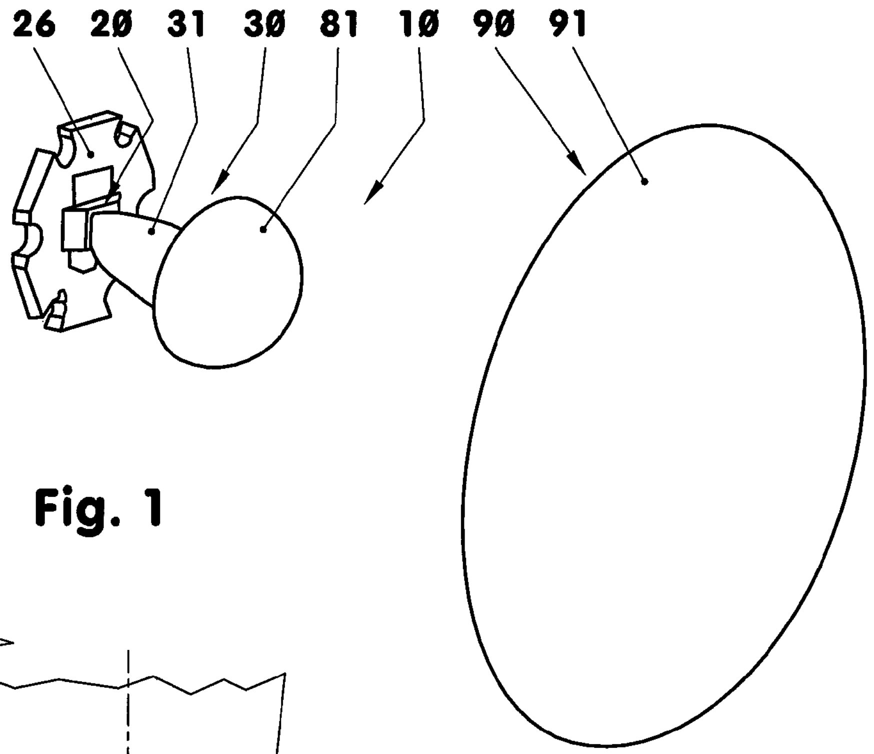
Figure 2:
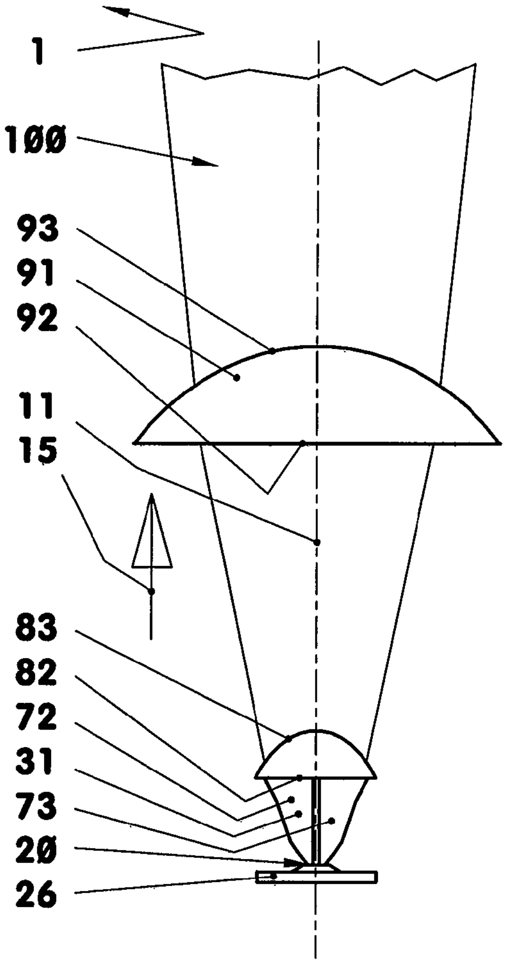
Figure 3:
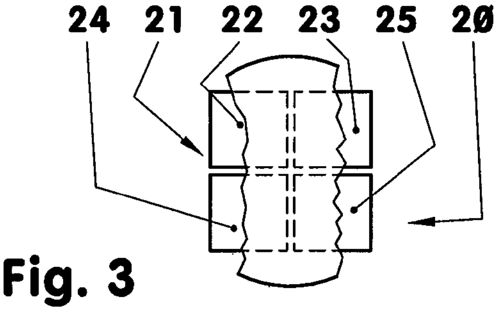
Figure 4:
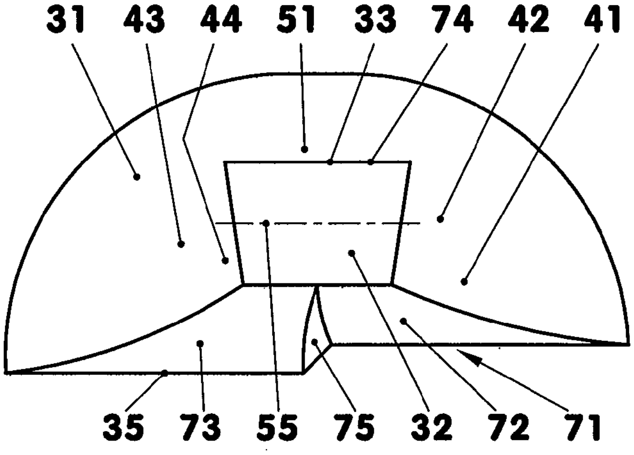
Figure 5:
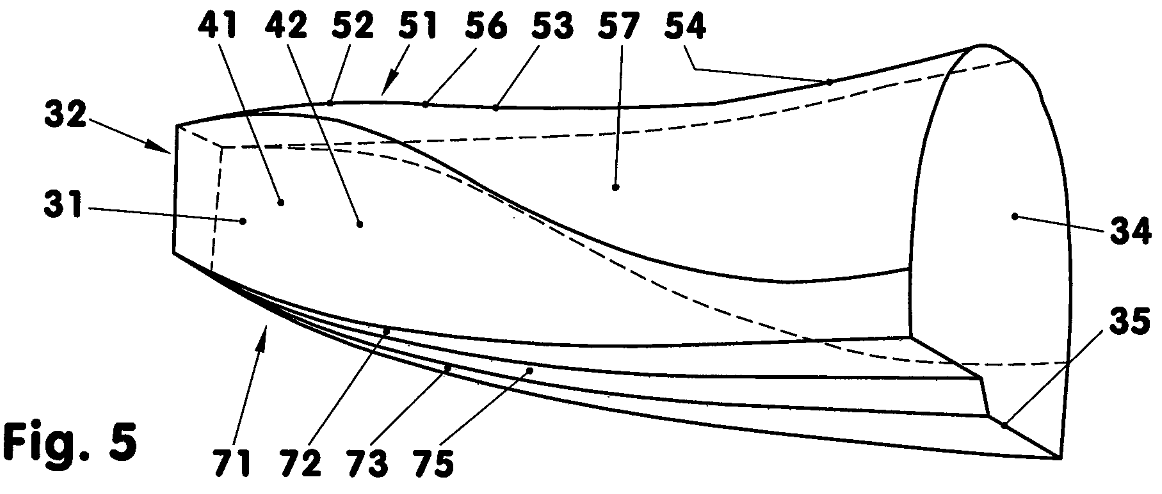
Figure 6:
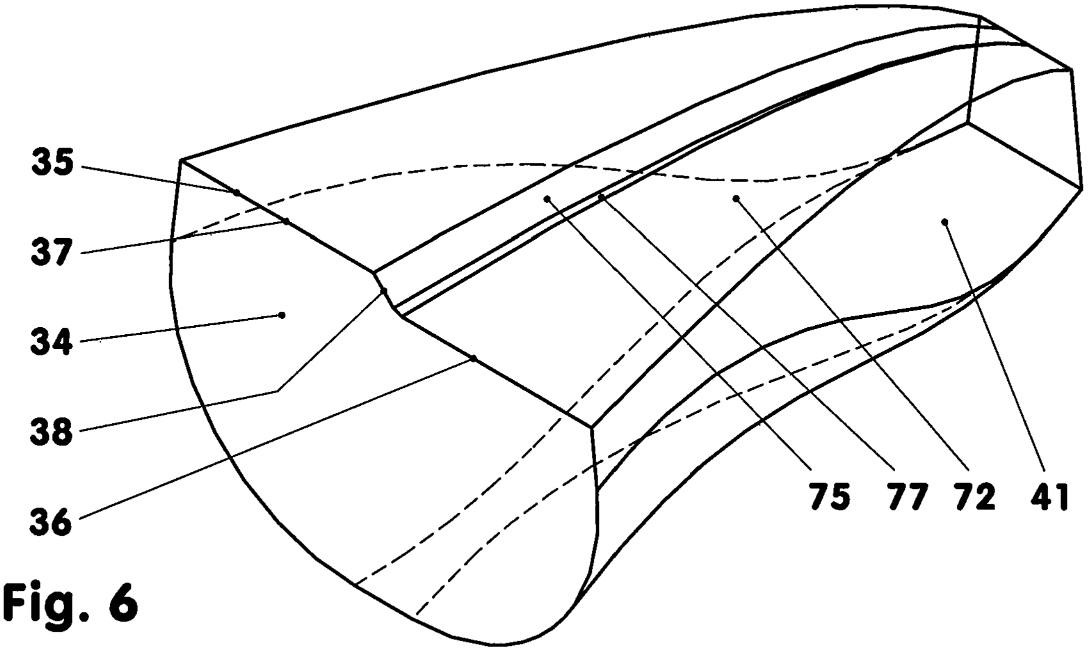
Figure 7:
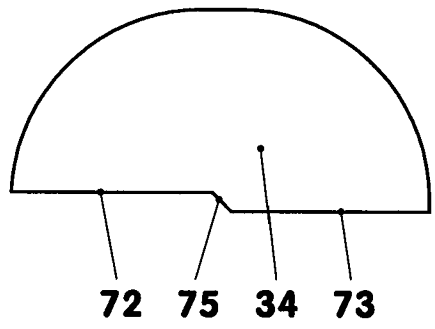
Figure 8:
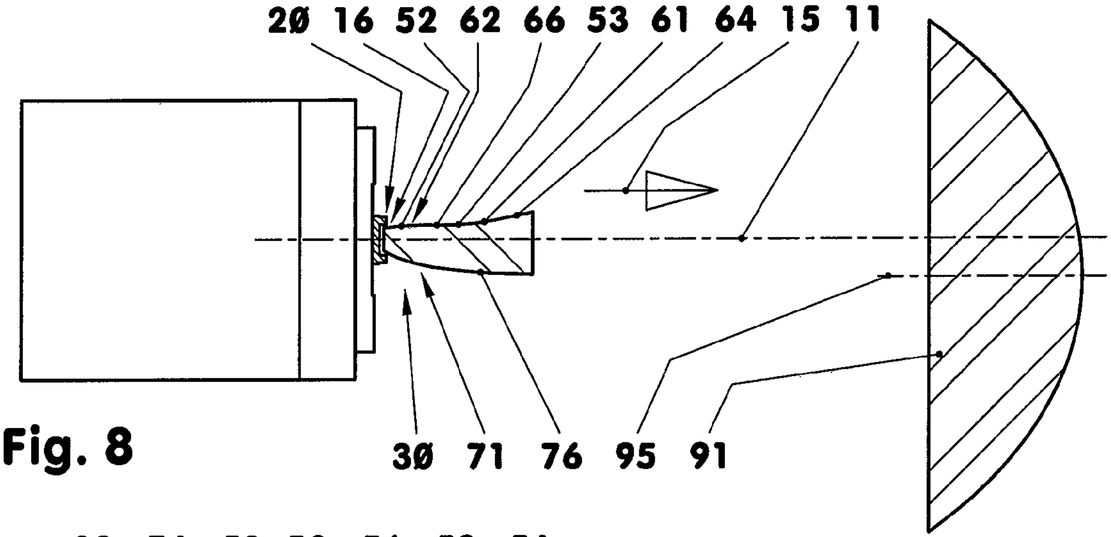
Figure 9:
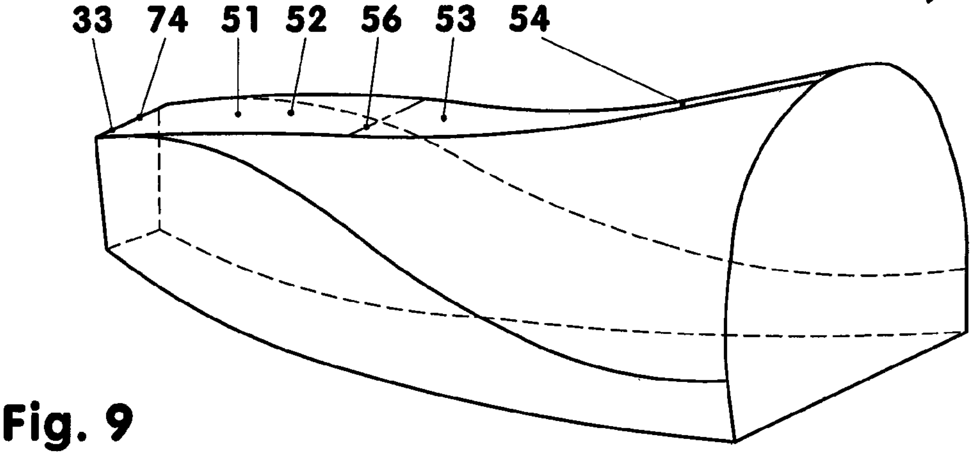
Figure 11:
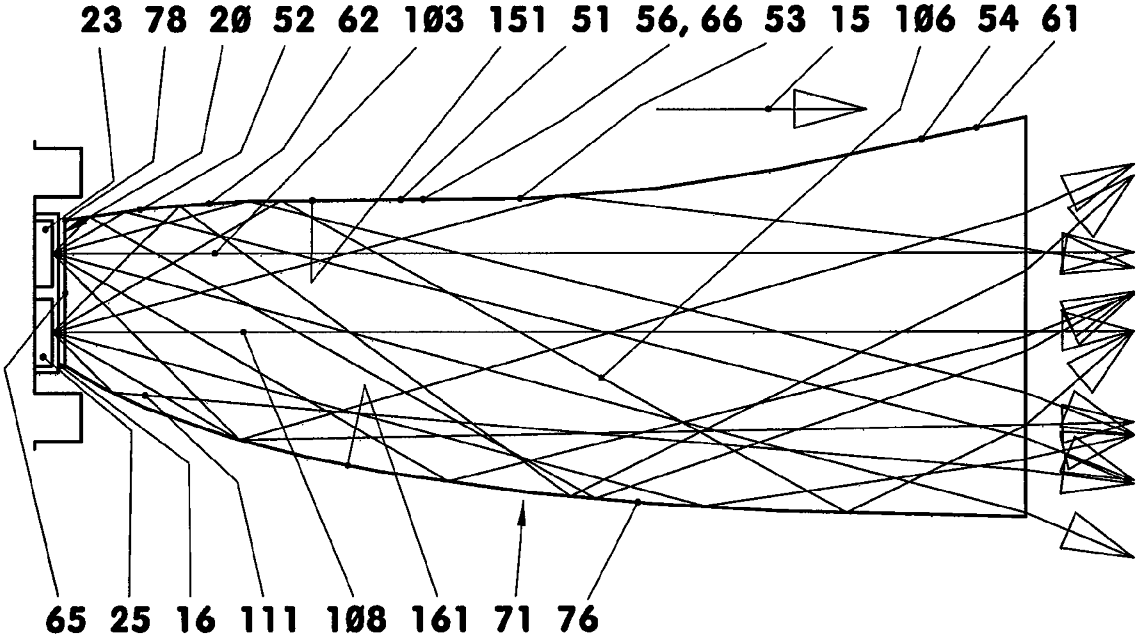
Figure 10:
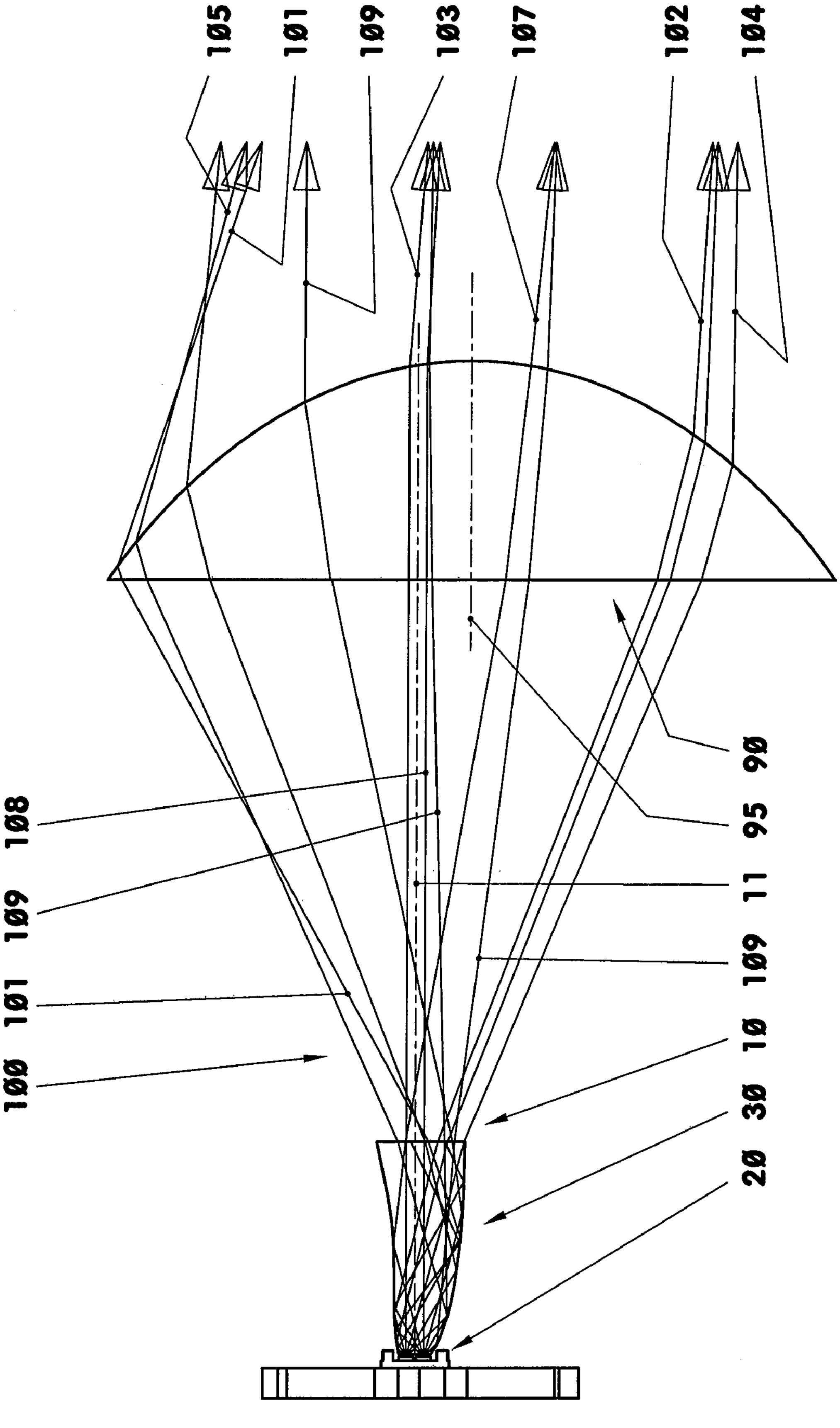
Figure 12:
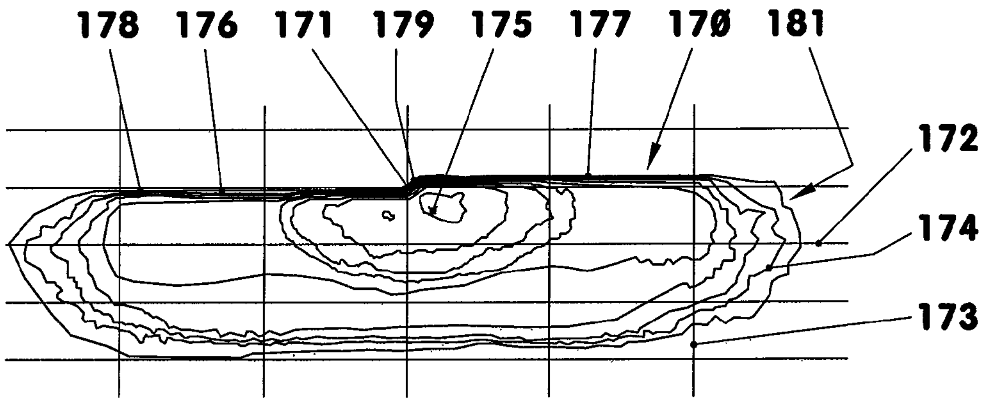
Figure 13:
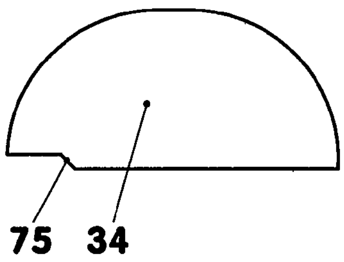
Figure 14:
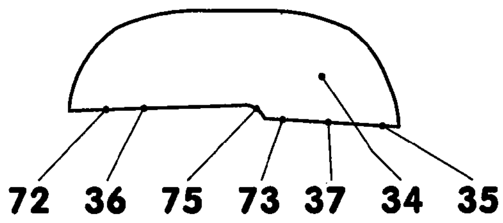
Figure 15:
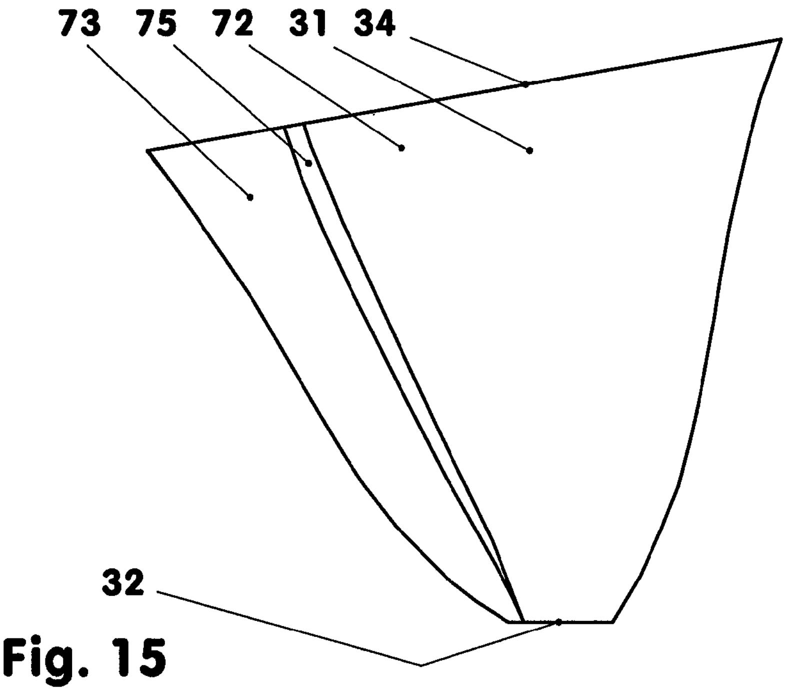

FIG. 1: Dimetric view of a light unit;

FIG. 2: View from below in FIG. 1;

FIG. 3: Arrangement of light sources;

FIG. 4: A view of the fiber-optic element from the light entry side;

FIG. 5: Dimetric view of the fiber-optic element;

FIG. 6: Dimetric view of the fiber-optic element from below;

FIG. 7: A light outlet surface;

FIG. 8: Longitudinal section of the light unit;

FIG. 9: View of a fiber-optic element obliquely from above;

FIG. 10: Beam path of a light unit;

FIG. 11: Beam path of the fiber-optic element;

FIG. 12: Light distribution diagram;

FIG. 13: Light outlet surface with offset transitional region;

FIG. 14: Light outlet surface with curved lower edges;

FIG. 15: Light distribution element with arched transitional region from below.

FIGS. 1 and 2 show a light unit (10), for example, a light module (10) of a vehicle headlight, in a dimetric view and in a view from below. The light module (10) includes, for example, a luminescent diode (20), primary optics (30) and secondary optics (90). The light propagation direction (15) is oriented from the luminescent diode (20) in the direction of secondary optics (90). The optical axis (11) of light module (10) intersects here the geometric center of the luminescent diode (20) and passes through primary optics (30) and secondary optics (90).

The luminescent diode (20), for example, an LED (20), sits in a base (26) and, in this practical example, comprises a group (21) of four light-emitting chips (22-25), which are arranged in a square, cf. FIG. 3. Each of the light sources (22-25) therefore has two directly adjacent light-emitting chips (23, 24; 22, 25; 22, 25; 23, 24). The light-emitting chips (22-25) of group (21) can also be arranged in a rectangle, triangle, hexagon, in a circle, with or without a center light source, etc. The individual light-emitting chip (22-25) in this practical example is square and has an edge length of 1 millimeter. The distance of the light-emitting chips (22-25) relative to each other is a tenth of a millimeter, for example. A variant with a single light-emitting chip (22; 23; 24; 25) is also conceivable. The light-emitting diode (20) has a transparent body here, which has a length of 1.6 millimeters in the light propagation direction (15) from base (26).

The primary optics (30) in the practical examples depicted in FIGS. 1 and 2 includes a fiber-optic element (31) and an optical lens (81) connected after the fiber-optic element (31) in the light propagation direction (15). The distance from the fiber-optic element (31) to LED (20) is a few tenths of a millimeter, for example, between 0.2 millimeter and 0.5 millimeter. The intermediate space (16) between the fiber-optic element (31) and the LED (20) can be filled, for example, with a silicone-like transparent material.

The fiber-optic element (31) is a plastic element made of a highly transparent thermoplastic, for example, polymethylmethacrylate (PMMA) or polycarbonate (PC). This material of the fiber-optic element (31), designed, for example, as a solid element, has a refractive index of 1.49. The length of the fiber-optic element (31) in this practical example is 13.5 millimeters. The fiber-optic element (31) of the light unit (10) described here can also have a length between 15 and 16 millimeters.

The fiber-optic element (31) is shown in detail in FIGS. 4-7. FIG. 4 here shows a view of the fiber-optic element (31) from the light entry side (32). Dimetric views of the fiber-optic element (31) are shown in FIGS. 5 and 6 and FIG. 7 shows the light outlet surface (34). The light entry surface (32) facing the light sources (22-25) and the light outlet surface (34) facing away from light surfaces (22-25) are arranged parallel to each other in this practical example and normal to the optical axis (11). The light entry surface (32) here is a trapezoidal flat surface. The short baseline, which has a length of 2.4 millimeters, for example, is arranged on the bottom. The long baseline on top is 3.02 millimeters long, for example. The surface area of the light entry surface (32) in this practical example is 5.5 square millimeters. The light entry surface (32) can also be square, rectangular, etc.

The light outlet surface (34) has an area of 44 square millimeters. Its height is 5.8 millimeters here, its maximum width 9 millimeters. The light outlet surface (34) in the practical example has at least roughly the shape of the section of an oval. The imaginary center line of the light outlet surface (34), for example, is offset downward by 7% of the height of the light outlet surface (34), with reference to optical axis (11). The lower edge (35) of light outlet surface (34) has two sections (36, 37), offset in height relative to each other, which are connected to each other by a connection section (38).

The side surfaces (41, 43) of the fiber-optic element (31) are arranged in mirror image fashion to each other. They each have a flat surface section (42, 44). These surfaces sections (42, 44) lie in planes that enclose an angle of 13 degrees, oriented in the direction of fiber-optic element (31). The imaginary intersection lines of the planes lies beneath the fiber-optic element (31). The surface sections (42, 44), designated here as flat surface sections (42, 44), can also be twisted in the longitudinal direction.

The cover surface (51) of fiber-optic element (31), on the top in FIGS. 4 and 5, includes in this practical example a cylindrically developed parabolic surface section (52), a uniaxially bent surface section (53) and a flat surface section (54). These surface sections (52-54) are arranged one behind the other in the light propagation direction (15), the parabolic surface section (52) bordering the light entry surface (32) and the flat surface section (54) bordering the light outlet surface (34). The imaginary axes of curvature of the surface sections (52, 53) lie parallel to the upper edge (33) of light entry surface (34).

The length of the parabolic surface section (52) is 30% of the length of cover surface (51), for example. The focal line (55) of the corresponding parabolic surface in this practical example lies in the center in the light entry surface (32). It is oriented parallel to the upper edge (33) of the light entry surface (32) and intersects the optical axis (11). The parabolic surface section (52) is therefore mathematically negatively curved, i.e., clockwise, with reference to the light propagation direction (15).

The cover surface (51) in FIGS. 8 and 11 is shown in longitudinal section as a curve (61) and the parabolic surface section (52) as a parabolic section (62). The parabolic section (62) is part of a second-order curve. It is rotated, for example, by 118 degrees clockwise, relative to a parabola, which lies symmetric to the upward-oriented ordinate of a Cartesian coordinate system lying in the plane of the drawing. The imaginary rotation point of the parabola (and the coordinate system referred to the parabola) is the focus (65) as point of focal line (55). The abscissa of the parabola-referred coordinate system is the directrix of the parabola, the ordinate intersects focal line (55). The distance of the focus from the origin of the parabola-referred coordinate system in this practical example is 1.49 millimeters. With y as ordinate value and x as abscissa value of the parabola-referred coordinate system, the parabola shown here has at least roughly the equation: $y=0.15*x^2+x$.

The length of the bent surface section (53) is 45% of the length of the fiber-optic element (31). The bending radius corresponds, for example, to two and one-half times the length of the fiber-optic element (31). The bending line lies outside of the fiber-optic element (31) on the side of cover surface (51). The flat section (53) is therefore mathematically positively curved counterclockwise. The transition between the parabolic surface section (52) and the bent surface section (53) is tangential. The cover surface (51) in this transition has an inflection line (56). In longitudinal section, cf. FIGS. 8 and 11, the curve (61) has an inflection point (66).

The bent flat section (53) grades into the flat surface section (54). The latter encloses an angle of 12 degrees, for example, with a plane normal to the light entry surface (32), in which the upper edge (33) lies. In longitudinal section, the curve (61) here has a straight section (64).

The upper long edges of the fiber-optic element (31) depicted in FIGS. 4 and 5 are rounded. The rounding radius increases in the light propagation direction (15), for example, linearly from zero millimeters to four millimeters. The roundings (57) can also be formed continuously in areas. They grade tangentially into the bordering surfaces (41, 51; 43, 51). These transitions are shown as solid lines for clarification in FIGS. 5 and 6. A variant without roundings (57) is also conceivable.

The bottom surface (71) of the fiber-optic element (31) in this practical example includes two parabolic surface sections (72, 73), offset relative to each other, which are developed cylindrically. The two parabolic surface sections (72, 73) are rotated relative to each other, for example, around a common axis, for example, the upper edge (33) of light entry surface (32). The angle of rotation in this practical example is 2 degrees, in which the parabolic surface section (73) positioned to the left in the light propagation direction (15) protrudes farther from the fiber-optic element (31) than the parabolic surface section (72) positioned to the right. The two parabolic surface sections (72, 73) have a common focal line (74), which coincides, for example, with the upper edge (33) of light entry surface (32). The outlet of both parabolic surface sections (72, 73) on the light outlet surface (34) lies parallel to optical axis (11). The parabolic surface section (72) abuts the lower sections (36) and the parabolic surface sections (73) the lower edge sections (37).

In the longitudinal section depicted in FIGS. 8 and 11, the parabolic surface section (72) is a parabolic section (76). The corresponding parabola is rotated, for example, by 71.5 degrees clockwise relative to a parabola that lies symmetric to the upper-oriented ordinate of a Cartesian coordinate system lying in the plane of the drawing. The imaginary rotation point of the parabola (and the coordinate system referred to the parabola) is the focus (78) as a point of focal line (74). The abscissa of the parabola-referred coordinate system is the directrix of the parabola, the ordinate intersects the focus (78). The distance of the focus (78) from the origin of the parabola-referred coordinate system in this practical example is 2.59 millimeters. With y as ordinate value and x as abscissa value of the parabola-referred coordinate system, the parabola depicted here has at least roughly the equation: $y=0.17*x^2+0.15*x+1.05$.

A transitional region (75) in this practical example lies between the two parabolic surface sections (73, 73). This is arranged at least roughly in the center along bottom surface (71). It encloses an angle of 135 degrees, for example, with the adjacent parabolic surface sections (72, 73). The height of the transitional region (75) therefore increases in the light propagation direction (15). In this practical example, the height of the transitional region (75) at the transitional region (38) of light outlet surface (34) is 0.5 millimeter.

The optical lens (81) of the primary optics (30), for example, is a plano-convex aspherical convex lens (81), for example, a condenser lens. The flat side (82) of lens (81) lies on the light outlet surface (34) of fiber-optic element (31) in the depiction of FIGS. 1 and 2. The optical lens (81) can also be integrated in the fiber-optic element (31). The maximum diameter of optical lens (81), for example, is 30% larger than the length of the fiber-optic element (31). The longitudinal section of the optical lens (81) is a segment of an ellipse, whose major axis is two and one-half times, and whose minor axis 160% of the length of the fiber-optic element (31). The thickness of optical lens (81) here is 50% of the length of the fiber-optic element (31). The light module (10) can optionally also be designed without optical lens (81), cf. FIGS. 8 and 10.

The secondary optics (90) in this practical example includes a secondary lens (91). This is an aspherical plano-convex lens. The envelope shape of this lens, for example, is a spherical section. The center (95) of the secondary lens (91) and the lower edge (35) of the light surface (34) of the fiber-optic element (31) have at least roughly the same spacing to optical axis (11) of light module (10). The radius of the spherical section in the depiction in FIGS. 1 and 2 is 240% and the height 110% of the length of fiber-optic element (31). The maximum distance of the flat surface (92) of the light outlet surface (93), the thickness of the secondary lens (91) corresponds to the length of fiber-optic element (31). The distance of the secondary lens (91) from the light outlet surface (34) is 260% of the length of the fiber-optic element (31).

During operation of the light module (10), light (100) is emitted, for example, from all light sources (22-25) and passes through the light entry surface (32) into fiber-optic element (31). Each light-emitting chip (22-25) acts as a Lambert emitter, which emits light (100) in the half-space.

A beam path of a light module (10) in a longitudinal section of light module (10) is shown in FIG. 10 as an example. The light module (10) depicted here corresponds to the light module (10) depicted in FIG. 8. FIG. 11 shows the beam path with in the fiber-optic element (31) enlarged.

In FIGS. 10 and 11, light beams (101-109) are shown as examples, which are emitted from two light-emitting chips (23, 25) arranged one above the other. The light-emitting chips (23, 25) are shown as point light sources here. The light beams (101-105), which are emitted offset relative to each other by 15 degrees, are shown from the upper light-emitting chip (23). The light beam (101) is emitted upward by 45 degrees, whereas light beam (105) is emitted downward by 45 degrees relative to optical axis (11). The corresponding light beams of the lower light-emitting chips (25) are light beams (106-109). Light (103) that is emitted from the upper light-emitting chip (23) parallel to optical axis (11) passes through light outlet surface (34) of the fiber-optic element (31) in the normal direction. It impinges on the flat surface (92) of secondary lens (91), also in the normal direction, passes through secondary lens (91) and is refracted away from the perpendicular at the passage point on emerging from secondary lens (91).

The light beams (102) emitted from the upper light-emitting chip (23), which include an upward-directed angle of 15 degrees and 30 degrees with the optical axis (11), impinge an on upper interface (151) of fiber-optic element (31). This upper interface (151) is formed by the cover surface (51) and has its size as a maximum. The corresponding impingement point here lies in the region of parabolic surface (52). The impinging light beams (102) enclose an angle with the normal at the impingement point that is greater than the critical angle of total reflection for the transition of the material of the fiber-optic element (31) with air. The upper interface (151) therefore forms a total reflection surface (151) for the impinging light (102). The reflected light beams (102) pass through the light outlet surface (34), in which they are diffracted away from the perpendicular at the passage point. On entering a secondary lens (91), the roughly parallel light beams (102) are refracted in the direction of the perpendicular at the corresponding passage point and are refracted away from the perpendicular on emerging into the surroundings (1). The depicted light beams (102) emerge here in the lower segment of the secondary lens (91) into surroundings (1).

The light (101), which is emitted from the upper light-emitting chip (23) at an upward-directed angle of 45 degrees, is initially reflected on the upper total reflection surface (151). The reflected light (101) impinges on the lower interface (161). The impingement angle of light (101) and the normal at the impingement point enclose an angle greater than the critical angle of total reflection. The lower boundary surface (161) therefore acts as a lower total reflection surface (161) for the impinging light (101). The light (101) reflected on this total reflection surface (161) passes through the light outlet surface (34) and the secondary lens (91), in which it is refracted on passing through the corresponding body interfaces (34, 92, 93). This light (101) enters the surroundings (1) in the upper segment of secondary lens (91).

The light beam (104) of the upper light-emitting chip (23) depicted in FIGS. 10 and 11, which encloses a downward-directed angle of 15 degrees with optical axis (11), is not reflected in the fiber-optic element (31). On passing through the light outlet surface (34) and secondary lens (91), it is refracted. This light beam (104) lies in the lower segment of secondary lens (91).

The light (105) emitted at a downward-directed angle of 30 degrees and 45 degrees to optical axis (11) in the mentioned FIGS. 10 and 11 is totally reflected on the lower interface (161) and enters the surroundings (1) during refraction through the light outlet surface (34) and secondary lens (91). This light (105) lies in the upper segment of secondary lens (91).

The light (108) emitted from the lower light-emitting chip (25) parallel to optical axis (11) is at least roughly parallel to the light (103) of the upper light-emitting chip (23).

Light (107), which is emitted under an upward-directed angle of 15 degrees, impinges on the upper interface (151) in the region of inflection line (56). Here, it is completely reflected and enters the surroundings (1) under refraction through the light outlet surface (34) in the lower segment of secondary lens (91).

The light beams (106) emitted from the lower light-emitting chip (25) at an angle of 30 degrees and 45 degrees to the optical axis (11) in FIGS. 10 and 11 are reflected on the upper (151) and lower interfaces (161).

The light beams (109) of the lower light-emitting chip (25), which enclose a downward-directed angle of 15, 30 and 45 degrees with the optical axis (11), are reflected on the lower interface (161). During refraction, they pass through the light outlet surface (34) and the secondary lens (91). For example, the light beams (109) emerging into surroundings (1) lie roughly symmetric to optical axis (11).

Of the total light (100) emitted from light sources (22-25) in this practical example, 48% is reflected on the lower interface (161) and 26% of the light on the upper interface (151).

In the view from below, cf. FIG. 2, the light bundle (100) is widened, for example, to an angle of 17 degrees.

The distribution of illumination intensity (170) generated by light module (10), for example, on a wall 25 meters away, is shown in FIG. 12. The center line (95) of secondary lens (91) passes through the measurement wall, for example, at intersection point (171) of two reference grid lines (172, 173). In this depiction, the horizontal grid lines (172) on the measurement wall have a spacing of two meters relative to each other. The spacing of the vertical grid lines (173) relative to each other is five meters. The individual isolines (174) are lines of equal illumination intensity. The illumination intensity, measured in lux or in lumen per square meter, increases in this diagram from the outside in. An inner isoline (174), for example, has 1.8-times the illumination intensity of an isoline situated farther out.

The secondary lens (91) images the light outlet surface (34) or (83) of primary optics (30) on the measurement wall. This light outlet surface (34, 83) can be the light outlet surface (34) of fiber-optic element (31) or the convex surface (83) of condenser lens (81). The region (175) of the highest illumination intensity, the so-called hot spot (175), lies here to the right beneath the intersection point (171). Upward, the illumination intensity drops quickly at the light-dark boundary (176). The light-dark boundary (176) is formed z-shaped here. In this depiction, it has a higher section (177) on the right and a lower section (178) on the left. Both sections (177, 178) are connected to each other by means of a connection section (179), which encloses an angle of, say, 135 degrees with the two other sections (177, 178). In this light-dark boundary (176), the lower edge (35) of the light outlet surface (34) images the primary optics (30).

The illumination intensity distribution depicted in FIG. 12 shows a broad illuminated area (181), whose illumination intensity diminishes in width with distance from the intersection point (171). Downward, the illuminated area (181) has a height of, say, four to six meters.

During operation, for example, of several light modules (10), an indistinctly limited illuminated area (181), free of spots and stripes, is therefore obtained, with a sharp, z-shaped light-dark boundary (176).

The light module (10) depicted in the practical examples, because of its geometric configuration, has high light output and requires only limited space. The relative decoupling efficiency attainable with such a light module (10) without additional reflections is 97% of the maximum possible decoupling efficiency. This corresponds to an absolute value of 80% to 82%.

In order to change the height position of light distribution, the lower parabolic surface sections (72, 73) can be rotated around focal line (74). In the view according to FIG. 8, rotation of the parabolic surfaces (72, 73) clockwise thus causes an increase in light distribution. At the same time, if optical axis (11) is not adjusted, the light-dark boundary (176) can be moved upward. The intensity of the hot spot (175) is retained in this case.

The light distribution on the measurement wall is obtained by overlapping of different light fractions, cf. FIG. 10. For example, the hot spot (175) is generated by overlapping of light fractions that are bounded by the upper light-emitting chip (23) in one segment between 0 degrees and 15 degrees downward and upward with light fractions that are bounded by the lower light-emitting chip (25) between 0 degrees and 15 degrees upward and between 30 degrees and 45 degrees downward.

In order to change the intensity of hot spot (175), the parabolic surface section (52) on the top can be changed. For example, in the longitudinal section of the fiber-optic element (31), rotation of the parabolic surface section (52) clockwise causes weakening of the intensity. A change in output (54) of the cover surface (51) changes the gradient of the light intensity distribution.

In addition, by displacing the start of the connection area, the height of the illumination intensity at hot spot (175) and around hot spot (175) can be controlled in targeted fashion. An unfavorable choice can cause weakening of hot spot (175).

The light (100) emerging from the light outlet surface (34) can be additionally bundled by means of condenser lens (81). A secondary lens (91) of limited diameter can therefore be used. The convex surface (83) of condenser lens (81) is an aspherical surface, for example.

The distance of secondary optical (90) from primary optics (30) also influences the illumination intensity distribution. In order to bundle the light (100) emerging divergently from the primary optics (30) at great distance, a larger secondary lens is required than at small distance. The larger secondary lens (91) (with an identical fiber-optic element (31)) permits the formation of hot spots (175), whereas a smaller spacing between primary optics (30) and secondary optics (90) and a smaller secondary lens (91) is required to form an ambient light distribution.

The light distribution to the sides of the illuminated area (181) can be influenced by the side surfaces (41, 43) and the roundings (57). Rotation of the side surfaces (41, 43) (with a fixed lower edge (35)) reduces the width of the light distribution diagram (171), cf. FIG. 12. A reduction of the radii of the roundings (57) causes a sharper transition from the illuminated to the non-illuminated area in the corners.

A light outlet surface (34) of a fiber-optic element (31) is shown in FIG. 13. The main dimensions of this light outlet surface (34) correspond to the main dimensions of the light outlet surface (34) depicted in FIG. 7. The transitional region (75) between parabolic surfaces (72, 73) is shifted leftward in comparison with FIG. 7. During installation of several light modules (10), they are arranged, so that during operation, the connection sections (179) coincide. Two asymmetrically divided illumination profiles therefore only partially overlap. In the center, in the region of the desired hot spot (175) and on the z-shaped light-dark boundary (176), an area of higher illumination intensity is therefore achieved, in comparison with the side regions.

Two parabolic surfaces (72, 73), as shown in FIG. 14, can be sloped relative to each other. Distorted images in the target plane can be compensated by this. The parabolic surfaces (72, 73) can also be arched in the transverse direction. Optionally, they can be additionally modified in the third of the fiber-optic element (31) adjacent to the light outlet surface (34).

The connection section (75) can be arched along the light distribution element (31) [sic], cf. FIG. 15. The sharpness of the light-dark boundary (176) is not influenced by this. However, the light concentration in the vicinity of hot spot (175) can be influenced by this. A laterally tilted arrangement of the fiber-optic element (31) causes a shift in the center of the illumination intensity distribution (181) on the wall. In this practical example, the light entry surface (32) and the light outlet surface (34) are not parallel to each other.

The connection section (75) can have transitional radii (77) in the transition to the parabolic surfaces (72, 73), cf. FIG. 6.

The fiber-optic element (31) can also include two parabolic surfaces (72, 73) on the bottom, which are directly adjacent to each other and are sloped, for example, by 15 degrees to each other. Illumination, for example, with a 15 degree rise can be produced by this.

It is also conceivable to design the bottom surface (71) with only one parabolic surface (72; 73), cf. FIG. 9. With such a light module (10), a horizontal light-dark boundary (176) is generated. The corresponding light module (10) can be designed in this case, so that a hot spot (175) is generated. In this practical example, the cover surface (51) also has a parabolic surface section (52), a bent surface section (53) and a flat surface section (54). An inflection line (56) lies between the parabolic surface section (52) and the bent surface section (54).

The bottom surface (71) can be described, at least in areas, by a family of parabolas lying next to each other and oriented in the light propagation direction (15). These parabolas can have different parameters.

The bottom surface (71) and the cover surface (51) of the fiber-optic element (31) can also be replaced, so that the surface designated here as bottom surface (71) lies on the top. The illumination intensity distribution is then such, that the light-dark boundary (176) lies on the bottom.

The surfaces described here can be envelope surfaces. The individual surface sections can therefore be free-form surfaces, whose envelope surfaces are parabolic surfaces. The focal lines (55, 74) can be shifted in the light propagation direction (15).

It is also conceivable to design the parabolic surface section (52) of cover surface (51) with individual steps. From every two adjacent interface sections of the fiber-optic element (31), a boundary surface section then includes a total reflection surface (151), in the fashion of a parabolic surface, for the light (101-105) emitted from the upper light-emitting chip (23), whereas the other interface section includes a total reflection surface for the light (106-109) emitted from the lower light-emitting chip (25). The bottom surface (71) can optionally also be designed in steps.

LIST OF REFERENCE NUMBERS

1 Surroundings
10 Light unit, light module
11 Optical axis
15 Light propagation direction
16 Intermediate space
20 Light-emitting diode, luminescent diode
21 Group of light sources
22-25 Light sources, light-emitting chips
26 Base
30 Primary optics
31 Fiber-optic element
32 Light entry surface
33 Upper edge of (32)
34 Light outlet surface
35 Lower edge of (34)
36, 37 Sections of (35)
38 Transitional section of (35)
41 Side surface
42 Flat surface section
43 Side surface
44 Flat surface section
51 Cover surface
52 Parabolic surface section
53 Bent surface section
54 Flat surface section; outlet for (51)
55 Focal line
56 Inflection line
57 Roundings
61 Curve
62 Curve section, parabolic section
64 Straight section
65 Focus of (62)
66 Inflection point
71 Bottom surface
72 Parabolic surface section
73 Parabolic surface section
74 Focal line
75 Transitional region
76 Curve section, parabolic section
77 Transition radius
78 Focus of (76)
81 Optical lens, convex lens, condenser lens
82 Flat side
83 Convex surface, light outlet surface of (81)
90 Secondary optics
91 Secondary lens
92 Flat surface
93 Light outlet surface
95 Center line of (91)
100 Light, light bundle
101-105 Light beams from (23)
106-109 Light beams from (25)
151 Upper interface, total reflection surface
161 Lower interface, total reflection surface
170 Illumination intensity distribution
171 Intersection point
172 Reference grid lines, horizontal
173 Reference grid lines, vertical
174 Isolines
175 Area of highest illumination intensity, hot spot
176 Light-dark boundary
177 Section of (176)
178 Section of (176)
179 Connection section
181 Illuminated area

The invention claimed is:

1. A light unit comprising:

a light emitting diode (20) having a light emitting chip (22; 23; 24; 25) as a light source for emitting light in a direction of light propagation (15);

primary optics (30) optically connected to said light emitting diode (20) to receive the light emitted therefrom; and a secondary lens (91) optically coupled to said primary optics (30) for further directing the light emitted by said light emitting diode (20);

wherein said primary optics (30) includes a fiber-optic element (31) widening in the direction of light propagation (15), said fiber-optic element (31) having a bottom surface (71) and a cover surface (51), each having an oppositely curved section (76, 62, respectively) adjacent to a light entry surface (32) of said fiber-optic element (31) wherein one of said curved sections (76, 62) includes an inflection point (66) and one of said curved sections (76, 62) has at least two curved surface sections (72, 73) arranged offset relative to each other defining an angled transition area (75) extending therebetween.

2. A light unit (10) according to claim 1, characterized by the fact that the light-emitting diode (20) includes a group (21) of light-emitting chips (22-25) as light sources.

3. A light unit (10) according to claim 2, characterized by the fact that each light-emitting chip (22-25) has at least two directly adjacent light-emitting chips (23, 24; 22, 25; 22, 25; 23, 24) within the group (21).

4. A light unit (10) according to claim 1, characterized by the fact that the curved sections (62, 76) are parabolic sections.

5. A light unit (10) according to claim 4, characterized by the fact that an abscissa of a parabola referred coordinate system includes at least an angle of 50 degrees with an optical axis (11) of light unit (10).

6. A light unit (10) according to claim 1, wherein the curve (61), including the inflection point (66), has a straight section (64).

7. A light unit (10) according to claim 1, characterized by the fact that the light-emitting chips (22-25) are arranged in a square.

8. A light unit (10) according to claim 1, characterized by the fact that two oppositely arranged surfaces (41, 43) of the fiber-optic element (31) connecting the cover surface (51) and the bottom surface (71) each include at least one flat surface section (42, 44), in which said flat surface sections (42, 44) define an acute angle oriented in the direction of fiber-optic element (31) lying outside said bottom surface (71).

9. A light unit (10) according to claim 1, characterized by the fact that the transitional region (75) defines complementary angles of 135 degrees with the two surface sections (72, 73) at the intersections therebetween.

10. A light unit (10) according to claim 1 wherein, the fiber-optic element (31) includes longitudinal edges facing away from surface sections (72, 73), said longitudinal edges having roundings (57).

11. A light unit (10) according to claim 10, characterized by the fact that the radius of curvature of said roundings (57) increases in the light propagation direction (15).

12. A light unit (10) according to claim 1 wherein said primary optics (30) includes, a convex lens (81) optically connected after the fiber-optic element (31), and optically connected in front of said secondary lens (91).

* * * * *